United States Patent [19]

Tinder et al.

[11] Patent Number: 4,826,273
[45] Date of Patent: May 2, 1989

[54] REMOTE, AUTOMOTIVE LIGHT DIVERTING SYSTEM

[75] Inventors: David V. Tinder, Dearborn; Glen G. Wodnicki, Sterling Heights, both of Mich.

[73] Assignee: United Technologies Automotive, Inc., Dearborn, Mich.

[21] Appl. No.: 86,465

[22] Filed: Aug. 18, 1987

[51] Int. Cl.$^4$ ............................................. G02B 6/00
[52] U.S. Cl. ..................................... 350/96.10; 362/32
[58] Field of Search ....................... 350/96.10; 362/32

[56] References Cited

U.S. PATENT DOCUMENTS

| | | | |
|---|---|---|---|
| 3,439,157 | 4/1969 | Myles | 362/32 |
| 4,084,215 | 4/1978 | Willenbrock | 362/32 |
| 4,379,613 | 4/1983 | Coburn | 350/96.1 |
| 4,585,298 | 4/1986 | Mori | 362/32 |

OTHER PUBLICATIONS

Markovich, "New! Piped-In Dash Lighting", *Mechanix Illustrated*, vol. 62, No. 461, Oct. 1966, pp. 92-93 and 152.
Edmund Scientific Co., "Explore New Fiber Optic Design Concepts", Cataloge 701, Sep. 1969, p. 12.

*Primary Examiner*—James W. Davie

[57] ABSTRACT

A light pipe including a light diverting section, in which light flowing through the light pipe in a longitudinal direction is diverted at least generally radially out from the light pipe or, alternatively, the light diverting section can be used as a receiver (rather than a transmitter) to collect light rays from light emanating around the device and divert them for passage down through the light pipe. An automotive application of the former, transmitter mode is serving as a visual indicator from a remote location in which the surface end of the light pipe is not clearly visible, such as for example on a "black box" located under a vehicle seat. An automotive application of the latter, receiver mode is as a light collector to receive or accept infrared rays from any compass position and from a range of vertical positions and direct them to a receptor, as part of an infrared personal entry system into the vehicle. The light diverting section includes a centrally located reflective surface on its side distal to the light pipe section which is conical (FIGS. 4 and 5) or concavely curved (FIGS. 1 and 2), the latter causing vertical as well as radial dispersion.

20 Claims, 2 Drawing Sheets

REMOTE, AUTOMOTIVE LIGHT DIVERTING SYSTEM

FIELD OF THE INVENTION

The present invention relates to remote, automotive light diverting systems using a light pipe which includes a light diverting section, in which light flowing through the light pipe in a longitudinal direction is diverted at least generally radially out from the light pipe or, alternatively, the light diverting section can be used as a receiver (rather than a transmitter) to collect light rays from light emanating around the device and divert them for passage down through the light pipe. One particular, exemplary automotive application of the former, transmitter mode is serving as a visual indicator from a location in which the end of the light pipe is not directly visible, such as for example a "black box" located under a vehicle seat. An exemplary automotive application of the latter, receiver mode is as a light collector to accept infrared rays from any compass position and from a range of vertical positions and direct them to a receptor, as part of an infrared remote personal entry system into the vehicle.

GENERAL BACKGROUND

In the automotive art an electronic "black box" is sometimes located beneath the driver's seat, with the box having a visual indicator as part of its testing circuit. In order to test the circuit for proper operation, a button is depressed causing a light emitting diode (LED) to light, indicating that the "black box" is operating properly.

However, because of the remote location of the "black box", the light indicator is often difficult to see, requiring the tester to, for example, bend down and attempt to, not only look under the seat, but to try to visually align his sight in line with the specific location of the LED or, for example, an extending light pipe terminating at the exterior, top surface of the "black box."

To overcome this problem an initial application of the present invention is to cause the light rays emanating from the LED to be dispersed radially out from around the distal end of the light pipe and further, preferably to cause the at least generally radial dispersion to be also upwardly diverted, creating a surrounding light pattern, which is not only planar, but is also diverted upwardly, greatly increasing the various possible visual lines of sight available to detect the lighting-up of the LED.

This specific application of the invention thus avoids awkwardness and difficulty in viewing the indicator light for the "black box", although located in a rather remote position, without adding significantly to the exterior bulk of the "black box".

Alternatively, the invention is useable, not only as a transmitter, causing longitudinally traveling light rays to be dispersed at least generally radially outwardly from the longitudinal direction or axis of a light pipe, but also to serve as a receiver or collector. In the latter receiver application, the device collects light emanating from around the light pipe from, for example, various, diverging or radial directions, collecting them into the end of the light pipe for then traveling longitudinally through the light pipe to, for example, a detector or light sensor. An exemplary automotive application of the latter, receiver mode is as a light collector to accept infrared rays from any compass position and from a range of vertical positions and direct them to a receptor, as part of an infrared remote personal entry system into the vehicle.

The light pipe and light diverting system of the present invention can be substantively identical for the two applications, the primary difference being in the direction of light flow.

SUMMARY OF THE INVENTION

The present invention includes an elongated light pipe section having preferably integrally formed therewith a light diverting section, wherein light traveling longitudinally through the light pipe is or has been diverted in its direction at least generally radially with respect to the longitudinal axis of the light pipe. This diversion is achieved by the light striking the interior side of an exterior surface which is diverging laterally and distally away from the longitudinal axis of the light pipe. Preferably, particularly when the exterior light pattern involved occupies more than a radial plane, the diverging surface is a curved rather than merely a conical surface, preferably with its lowermost point being coincident with a point on the longitudinal, central axis of the light pipe.

Thus, for example, light rays traveling up through the light pipe in its longitudinal direction strike the interior side of the diverging surface, causing it to then be at least generally radially diverted out of the light pipe. If the diverging surface is a conical one, the diverging light rays will be radially dispersed in a relatively concentrated horizontal planar area. On the other hand, if the diverging surface is curved, the diverging rays will not only occupy a horizontal plane, but will also be diverted in an upwardly, dispersed direction, allowing the light to be easily seen from many different angles located above the end of the light pipe.

Alternatively, if the invention is to be used as a receiver, rather than a transmitter, light flowing laterally into the sides of the end of the light pipe strike the interior diverging surface, causing a substantial portion thereof to be diverted downwardly into and along the longitudinal axis of the light pipe. Hence, light emanating from one or more radially located directions is collected down at the proximal end of the light pipe, causing the collected light to then strike, for example, a detector or light sensor.

Thus, a basic object of the present invention is to provide a light diverting system, wherein light traveling down a light pipe can be at least generally radially dispersed around and about the terminal or distal end of the light pipe or, alternatively, to provide a collector of light emanating from various radial directions about the distal end of the light pipe to be collected down for travel through the light pipe to its proximal end.

An exemplary application for the transmitter mode of the invention is as a light indicator for an LED located within a "black box" located in a relatively remote location, such as for example underneath the passenger seat in an automotive vehicle, allowing the indicator to be relatively easily seen from many different directions, elevationally or radially.

An exemplary application for the receiver mode of the invention is, for example, as part of an infrared remote personal entry system. In such an application a simple optical system is required to accept infrared rays from any compass position and from a range of vertical positions and direct the rays to a receptor.

The light diverting, diverging surface can be curved in order to increase the vertical or upward extent of the light dispersion or collection characteristics, and the degree of curvature can be customized for specific applications, depending upon the amount of vertical dispersion desired. Typically, the diverting surface will have its lowermost or center point coincident with a point on the longitudinal, centerline axis of the light pipe, providing a symmetry of dispersion about the centerline of the light pipe.

Alternatively, if desired, the centerline of the diverging surface could be offset or even angularly located with respect to the centerline of the light pipe to provide a non-symmetrical dispersion of the light rays, when desired. Thus, where 360° symmetry about the longitudinal axis is not needed or desired, other angular and geometric configurations could be used to, for example, produce at least generally radial dispersion to only one side, that is, providing for example only 180° dispersion in the horizontal plane.

The light diverting section, which can be in the form of a button located at the distal end of the light pipe, is preferably integrally formed with the light pipe, so as to provide a continuous, solid medium for the light to flow through in its being diverted between the longitudinal and the generally radial directions. Preferably the light diverting section also has a larger diameter than that of the longitudinally extended light pipe section, providing a shoulder area for easy mounting of the device with the button located on and extending above the exterior surface of for example a "black box".

These and other objects and advantages of the present invention will become apparent from the following detailed description taken in connection with the accompanying drawings.

BRIEF DESCRIPTION OF THE DRAWINGS

FIG. 1 is a side, simplified view of the preferred embodiment of the light diverting system of the present invention; while

FIG. 4 is a side, generalized view, similar to that of FIG. 1, but of a second embodiment having a "flat" conical diverting surface rather than a curved diverting surface, included for comparison of the resultant diverted light pattern, which forms a pure radial planar area of light dispersion; while

DETAILED DESCRIPTION OF THE PREFERRED EMBODIMENTS

Figure 1:
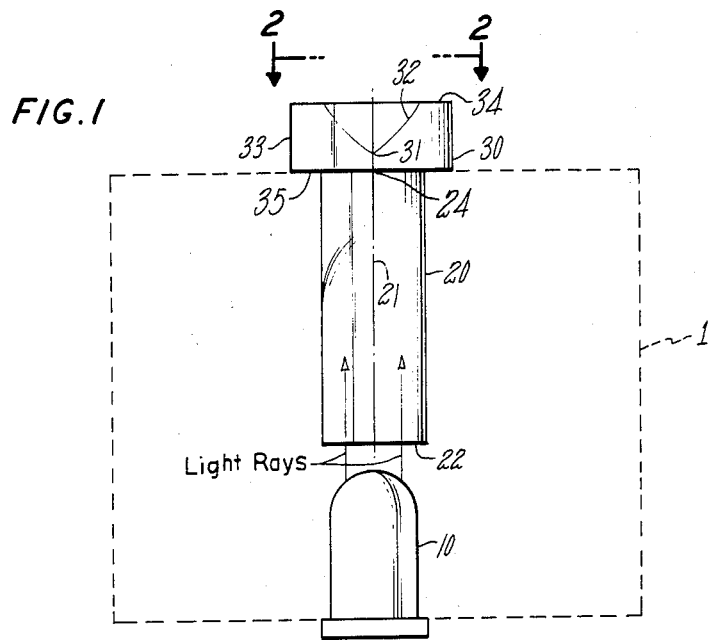

As can be seen in FIG. 1, a light emitting diode (LED) 10 or other enclosed light source is located at the proximal end 22 of a cylindrical, transparent light pipe section 20, which in turn has at its distal end 24 a cylindrical, transparent, light diverting section or button 30. When the LED 10 is activated, light generated therefrom enters into the proximal end 22 of the transparent light pipe 20 flowing up therethrough parallel to the centrally located, longitudinal axis 21.

As the light flows up and into the transparent light diverting section 30, the light rays, as will be explained more fully below, impinge upon the light diverting, diverging surfaces 32, causing the light rays then to be spread out and diverted into an at least generally radial array, outside into the ambient surrounding the distal end 34 of the light diverting section 30.

Figure 3:
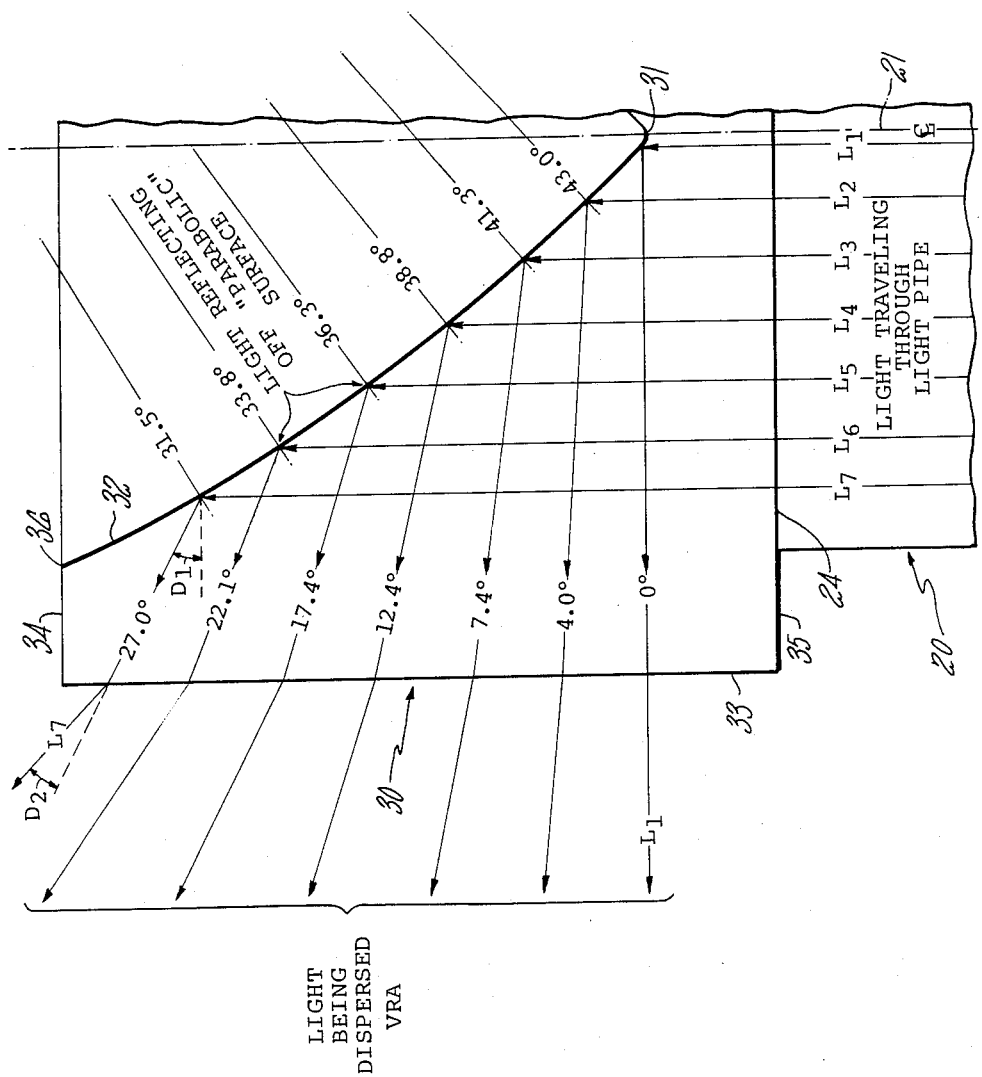
FIG. 3 is a side, simplified, partial view of the light diverting section of the embodiment of FIGS. 1 and 2, illustrating the light flow pattern of the light rays as they travel up through the light pipe and strike the interior side of the diverging, light diverting surface, producing an at least generally radial array of diverted light surrounding the distal end of the light diverting section and, with the curved diverting surface illustrated, having vertical dispersion as well.

With reference to FIG. 3, the light rays $L_1$-$L_7$ initially travel in a parallel array in the direction of the longitudinal axis 21 of the light pipe 20. However, for example, when light ray $L_1$ strikes the interior side of the light diverting surface 32, it is reflected off of that surface and begins to flow in a generally radial direction to the longitudinal axis 21, making an angle of nearly zero degrees with respect to the horizontal plane, when viewed from the perspective of FIG. 3. With the light diverting, diverging surface 32 being curved, as illustrated, the light rays located further out from the central axis 21 are diverted at a greater angle to the horizontal plane. Thus, for example, light ray $L_2$ makes approximately a 4° angle with the horizontal, while light ray $L_7$ makes approximately a 27° angle with the horizontal (angle $D_2$), as it is reflected off of the light diverting surface 32.

Additionally, when the light rays $L_1$-$L_7$ pass through the side, cylindrical surface 33 of the light diverting section 30, the light rays are further angelarly diverted in the vertical direction, depending upon the index of refraction of the material from which the light diverting section is made. Thus, as can be seen most clearly with respect to the outermost light ray $L_7$, which strikes the side surface 33 at the greatest angle off the normal, a further angle of diversion $D_2$ is produced.

Accordingly, as can be seen from the light rays $L_1$-$L_7$ on the left side of the surface 33 in FIG. 3, the original, parallel light rays traveling in the light pipe 20 are diverted out into the ambient in a generally radial array, but with a greatly heightened, vertical thickness or vertical component. This provides both radial dispersion as well as vertical dispersion of the light rays (note bracketed vertical and radial array "VRA" in FIG. 3), which originally emanated longitudinally up from the LED 10.

When the light diverting section 30 is included, for example, on the top, exterior surface of, for example, a "black box" 1 or other box containing electronics located, for example, under the passenger seat 2 of an automobile or other like remote location, the dispersed light emanating both radially as well as vertically from around the distal end 34 of the light diverting section 30 allows the emanating light to be relatively easily and clearly seen from many different angles and locations around the box.

As illustrated, the outer diameter of the light diverting section or button 30 is greater than the outer diameter of the cylindrical light pipe section 20, forming a shoulder area 35, which rests on top of the exterior surface of the "black box" 1, with the stem 20 of the device extending down into the "black box" through a hole therein of like diameter. This aids in the mounting of the device on the "black box" and allows the enhanced visibility of the light from the LED without adding substantially to the bulk of the box.

Of course, it should be understood that the light flowing through the light pipe 20 will have more than the exemplary seven light rays $L_1$-$L_7$, specifically drawn in FIG. 3 for purposes of explanation. The seven exemplary light rays $L_1$-$L_7$ do show, as indicated on the figure, exemplary initial diversion angles $D_1$ from a minimum of near zero degrees up to 27° plus (light ray $L_7$), as the light rays are further located away from the central, longitudinal axis 21.

The light diverting, distally diverging surface 32 is preferably curved to form a concave, parabolic-like surface about the centrally located, longitudinal axis 21, with its lowermost point 31 being coincident with a point on the centrally located, longitudinal axis 21. The curve actually illustrated in FIG. 3, rather than a true parabola, is formed by rotating a concavely curved surface 360° about the central axis 21, that is, it is formed by an arcuate surface of revolution. As can be seen on the right side in FIG. 3, the points of reflection of the light rays $L_1$-$L_7$ on the surface 32 make an ever-decreasing angle with respect to the tangent to the curved surface at that point, beginning with, for example, light ray $L_2$ (angle of 43°) up to light ray $L_7$ (angle of $31\frac{1}{2}$°).

The maximum diameter at the terminus 36 of the light diverting surface 32 is preferably equal to and coincident with but vertically spaced above the outer diameter of the external light pipe section 20. The lowermost tip 31 of the surface 32 lies on the central longitudinal axis 21 but is spaced up from the distal end 24 of the light pipe section 20.

Figure 4:
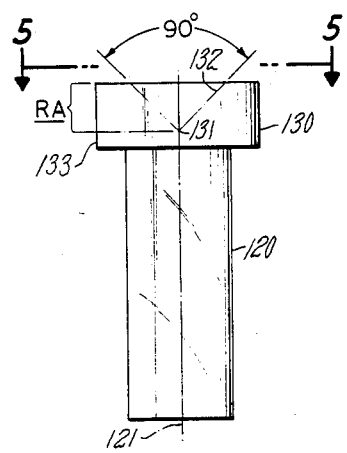
Figure 5:
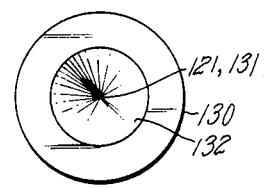
FIG. 5 is an end view thereof, taken from the perspective of perspective lines 5—5 of FIG. 4.

If the dispersion array for the light need only be located within a radial planar area, the diverting surface can be made conically, as illustrated in FIGS. 4 and 5, in which light pipe 120 and its integral light diverting section 130 has a light diverting, reflective distal surface 132 which is "flat", when viewed from the perspective of FIG. 4, as compared to the curved surface 32 of the embodiment of FIG. 1.

As can be seen in FIG. 4, parallel light rays traveling up through the light pipe 120 will strike the interior side of the light diverting, diverging surface 132, causing the light rays to be reflected and radially diverted out through the sides 133 of the light diverting section 130. If the angle of divergence of the surface 132 makes a total of 90° with respect to its opposed surface, as illustrated, the longitudinally traveling light rays will strike the reflective surface 132 at a 45° angle, causing the angle of reflection likewise to be 45°, resulting in the light rays striking the side surface 133 normally. With such a 90° impingement, no further diversion of the light rays take place due to the index of refraction of the material which makes up the light diverting section 130, and the light rays remain in a purely radially directed planar area "RA" (note FIG. 4) surrounding the light diverting section 130.

Figure 2:
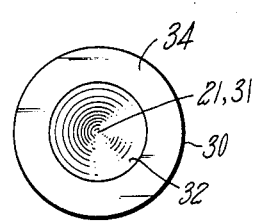
FIG. 2 is an end view of the embodiment of FIG. 1, taken from the perspective of perspective lines 2—2 of FIG. 1.

For exemplary dimensions, with reference to FIGS. 1 and 2, the concave curve for the exterior reflective surface 32 could have an exemplary radius of about 18.80 mm, the vertical thickness of the light diverting section 30 could be between for example $4\frac{1}{4}$ and $3\frac{3}{4}$ mm, with the lowermost point 31 of the diverting surfaces 32 being located between 1.90 mm and 1.70 mm from the distal end 24 of the light pipe section 20, the light pipe 20 having a vertical length of, for example, 14.50 mm to 14.20 mm. The diverting surfaces could form at its outermost extent 36 a circle having a diameter of from about 5.35 mm to about 5.65 mm, with the outside diameter of the light diverting section 30 being 8.60 mm to about 8.90 mm for the exemplary "black box" under the seat application disclosed.

The foregoing embodiments have been described in use as transmitters, that is, systems for transmitting light emanating from the LED 10 out to the ambient in planes radially extending around the device. However, with basically the very same structure for the light pipe section 20 (120) and the light diverting section 30 (130), the present invention could be used as well as a receiver or light collector, in which ambient light flowing, for example, radially into the sides 33 of the light diverting section 30 is collected and diverted down into the light pipe 20, ultimately emanating out from the proximal end 22 of the light pipe 20 to, for example, a light sensor or receptor (located in place of the LED 10). Thus, with respect to the light pipe section and the light diverting section, the structures could be the same, whether it is to be used as a light transmitter or a light receiver, the direction of flow of the light being the opposite in each case.

An exemplary automotive application of the latter, receiver mode is as a light collector to receive or accept infrared rays emanating from an infrared light source held by the user outside of the vehicle from any compass position and from a range of vertical positions and direct them to a receptor (located analogously to the LED 10), as part of an infrared remote personal entry system into the vehicle.

As mentioned, the light pipe section 20 and the light diverting section 30 are preferably integrally formed by, for example, injection molding of a suitable, transparent, plastic material, with an exemplary material being polycarbonate (or possibly an acrylic). Such material has, for example, an index of refraction of, for example, 1.586. The exterior sides of the light diverting surface 32 (132) can be silvered or otherwise coated to increase its reflectivity, if so desired. Additionally, although the stems 20, 120 of the light pipes are shown straight, they could be curved, if so desired.

Thus, of course, depending upon the specific application(s) involved, the preferred embodiments hereof are subject to great variation in material, dimension, configuration and design. Therefore, it should be understood that the invention is not to be limited to the exact details of construction shown and described.

Hence, although this invention has been shown and described with respect to detailed embodiments thereof, it will be understood by those skilled in the art that various changes in form and detail thereof may be made without departing from the spirit and scope of the claimed invention.

With respect to the spirit and scope of the invention, it should be understood that the phrase "an at least generally radial array" is intended to cover a "purely" radial array (as in the embodiment of FIGS. 4 and 5), as well as a radial array which also has vertical components of dispersion (as in the embodiment of FIGS. 1 and 2). Also the terms "vertical" and "horizontal" are used in a relative sense with respect to the longitudinal axis of the light pipe section as it enters the light diverting section, the longitudinal axis at that point being considered equivalent to the vertical direction, and not in an absolute or classical sense with respect to for example the earth's surface.

Having thus described at least one typical or exemplary embodiment of the invention, that which is claimed as new and desired to secure by Letters Patent is:

1. A remote automotive indicator light system for a viewer, comprising:
   a container of electronics located under the seat of the vehicle or other like remote location;
   an internal light source associated with an exterior surface of said container at an area substantially out of the direct line of sight of the viewer; and
   a light diverter, including a light pipe, which in turn comprises:
      an elongated, transparent section of light pipe through which light flows and having a longitudinal axis extending into said container adjacent to said light source; and
      a light diverting, transparent section included at one end of said light pipe section intimately formed therewith, and located on and extending above the exterior surface of said container, said light diverting section having an exterior, light diverting, interiorly reflective surface distal to said light pipe section angularly diverging away from said longitudinal axis distally to said light pipe section, light from said light source flowing through said light pipe section being angularly diverted to the exterior of said light diverting section by said light diverting surface with respect to said longitudinal axis in an at least generally radial array about said longitudinal axis, allowing the diverted, reflected light to be clearly viewed from many locations located around said container outside of the area beneath the seat of the vehicle or other like remote location.

2. The remote automotive indicator light diverter system of claim 1,
   wherein said exterior, light diverting, interiorly reflective surface forms a straight line in a vertical plane through said light diverting surface and is conically shaped.

3. The remote automotive indicator light diverter system of claim 1,
   wherein said exterior, light diverting surface forms a concavely curved line in a longitudinal plane through said light diverting surface, causing the diverted, reflected light to be longitudinally as well as radially arrayed about said longitudinal axis allowing the diverted, reflected light to be clearly viewed from many locations located above the container as well as around the container.

4. The remote automotive indicator light diverter system of claim 3,
   wherein the curved, light diverting surface is equivalent to a surface formed by rotating a concave curve 360° about an axis coincident with said longitudinal axis.

5. The remote automotive indicator light diverter system of claim 1,
   wherein said light diverting section forms a cylindrical button on top of said light pipe section, which itself is cylindrical but which has an outer diameter less than the outer diameter of said button forming a shoulder area therebetween, said cylindrical button located above said surface with said light pipe section extending down through a hole in said surface, said hole having a diameter less than the diameter of said cylindrical button.

6. The remote automotive indicator light diverter system of claim 5,
   wherein said light pipe section and said light diverting section are injection molded integrally together of a transparent, plastic material; and
   wherein said button has a thickness of the order of about 4 mm and an outer diameter of the order of about 8.75 mm, the concave curve for the exterior, interiorly reflective surface has a radius of the order of about 18.80 mm, and said light pipe section has an outer diameter of the order of about 5.5 mm.

7. A method of enhancing the visibility to a viewer of an indicator light on the exterior surface of a container of electronics located in a remote location, such as under the seat of a vehicle, which container has an internal light source associated with said exterior surface, said exterior surface being substantially out of the direct line of sight of the viewer, comprising the following step(s):
   (a) providing the container with a light diverter, including a light pipe, which in turn comprises:
      an elongated, transparent section of light pipe through which light flows and having a longitudinal axis extending into the container to the light source; and
      a light diverting, transparent section included at one end of said light pipe section intimately formed therewith, and located on and extending above the exterior surface of the container, said light diverting section having an exterior, light diverting, interiorly reflective surface distal to said light pipe section angularly diverging away from said longitudinal axis distally to said light pipe section; and
   (b) allowing light from the light source to flow through said light pipe section to be angularly diverted to the exterior of said light diverting section by said light diverting surface with respect to said longitudinal axis in an at least generally radial array about said longitudinal axis, allowing the diverted, reflected light to be clearly viewed from many locations located around the container outside of the remote location.

8. The method of claim 7, wherein there is included the further step(s) of:
   concavely curving said light diverting, interiorly reflective surface, causing the light to be longitudinally as well a radially dispersed.

9. An automotive light collector system for an infrared remote personal entry system for a vehicle or the like, comprising:
   a remote infrared light source;
   an enclosed, infrared light receptor on the vehicle;
   a light diverter on the vehicle, including a light pipe, which in turn comprises:
      a solid, light diverting, transparent section having an exterior, surrounding surface interfacing with the ambient; and
      an elongated, transparent section of light pipe through which light flows and having a longitudinal axis, the proximal end of which is located next to said light receptor; said light diverting section being included at the distal end of said light pipe section intimately formed therewith opposite to said light receptor, said light diverting section having an exterior, light diverting, interiorly reflective surface distal to said light pipe section angularly diverging away from said longitudinal axis distally to said light pipe section, light flowing from said remote, infrared light source from an at least generally radial direction into the sides of said light diverting section being angularly diverted into said light pipe section at least generally parallel to said longitudinal axis to said receptor.

10. The automotive light collector system of claim 9, wherein said exterior, light diverting, interiorly reflective surface forms a concavely curved line in a longitudinal plane through said light diverting surface, causing the diverted, reflected light to be longitudinally as well as radially arrayed about said longitudinal axis.

11. The automotive light collector system of claim 9, wherein said light pipe section and said light diverting section are injection molded together of a transparent plastic material.

12. A remote automotive indicator light system, comprising:
a vehicle having a seat for a human occupant;
a container of electronics located under said seat of the vehicle;
an internal light source associated with an exterior surface of said container at an area under said seat and substantially out of the direct line of sight of the occupant; and
a light diverter, including a light pipe, which in turn comprises:
an elongated, transparent section of light pipe through which light flows and having a longitudinal axis extending into said container to said light source; and
a light diverting, transparent section included at one end of said light pipe section intimately formed therewith, and located on and extending above the exterior surface of said container, said light diverting section having an exterior, light diverting, interiorly reflective surface distal to said light pipe section angularly diverging away from said longitudinal axis distally to said light pipe section, light from said light source flowing through said light pipe section being angularly diverted to the exterior of said light diverting section by said light diverting surface with respect to said longitudinal axis in an at least generally radial array about said longitudinal axis, allowing the diverted, reflected light to be clearly viewed from many locations located around said container outside of the area beneath said seat of the vehicle.

13. The remote automotive indicator light diverter system of claim 12, wherein said exterior, light diverting, interiorly reflective surface forms a straight line in a vertical plane through said light diverting surface and is conically shaped.

14. The remote automotive indicator light diverter system of claim 12, wherein said exterior, light diverting surface forms a concavely curved line in a longitudinal plane through said light diverting surface, causing the diverted, reflected light to be longitudinally as well as radially arrayed about said longitudinal axis allowing the diverted, reflected light to be clearly viewed from many locations located above the container as well as around the container.

15. The remote automotive indicator light diverter system of claim 14, wherein the curved, light diverting surface is equivalent to a surface formed by rotating a concave curve 360° about an axis coincident with said longitudinal axis.

16. The remote automotive indicator light diverter system of claim 12, wherein said light diverting section forms a cylindrical button on top of said light pipe section, which itself is cylindrical but which has an outer diameter less than the outer diameter of said button, forming a shoulder area therebetween, said cylindrical button being located above said surface with said light pipe section extending down through a hole in said surface, said hole having a diameter less than the diameter of said cylindrical button.

17. The remote automotive indicator light diverter system of claim 16, wherein said light pipe section and said light diverting section are injection molded integrally together of a transparent, plastic material; and
wherein said button has a thickness of the order of about 4 mm and an outer diameter of the order of about 8.75 mm, the concave curve for the exterior, interiorly reflective surface has a radius of the order of about 18.80 mm, and said light pipe section has an outer diameter of the order of about 5.5 mm.

18. A light diverter, including a light pipe, comprising:
an elongated, transparent section of light pipe through which light flows and having a longitudinal axis with a first end and a second end longitudinally spaced from said first end; and
a light diverting, transparent section included at said first end of said light pipe section intimately formed therewith, said light diverting section having an exterior, light diverting, interiorly reflective surface distal to said light pipe section angularly diverging away from said longitudinal axis distally to said light pipe section, said exterior, light diverting surface forming a concavely curved line in a longitudinal plane through said light diverting surface, the curved, light diverting surface being equivalent to a surface formed by rotating a concave curve 360° about an axis coincident with said longitudinal axis, causing the diverted, reflected light to be somewhat longitudinally as well as radially arrayed about said longitudinal axis, light coming in from said second end flowing through said light pipe section being angularly diverted to the exterior of said light diverting section by said light diverting surface with respect to said longitudinal axis in an at least generally radial array about said longitudinal axis, allowing the diverted, reflected light to be clearly viewed from many locations located around and to some degree above said light diverting section.

19. The remote automotive indicator light diverter system of claim 18, wherein said light diverting section forms a cylindrical button on top of said light pipe section, which itself is cylindrical but which has an outer diameter less than the outer diameter of said button, forming a shoulder area therebetween.

20. The remote automotive indicator light diverter system of claim 18,
   wherein said light pipe section and said light diverting section are injection molded integrally together of a transparent, plastic material; and
   wherein said button has a thickness of the order of about 4 mm and an outer diameter of the order of about 8.75 mm, the concave curve for the exterior, interiorly reflective surface has a radius of the order of about 18.80 mm, and said light pipe section has an outer diameter of the order of about 5.5 mm.

* * * * *